Aug. 26, 1930.   B. SCHOTTELIUS   1,774,293
POWER PRODUCING SYSTEM
Filed March 16, 1927   4 Sheets-Sheet 1

INVENTOR:
BY B. Schottelius
Emil Bönnelyche
ATTORNEY.

Aug. 26, 1930.    B. SCHOTTELIUS    1,774,293
POWER PRODUCING SYSTEM
Filed March 16, 1927    4 Sheets-Sheet 2
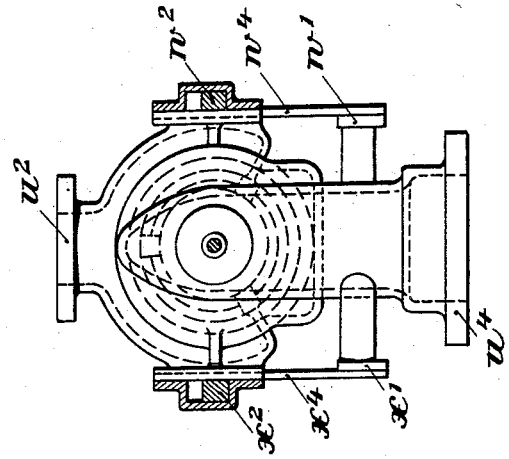
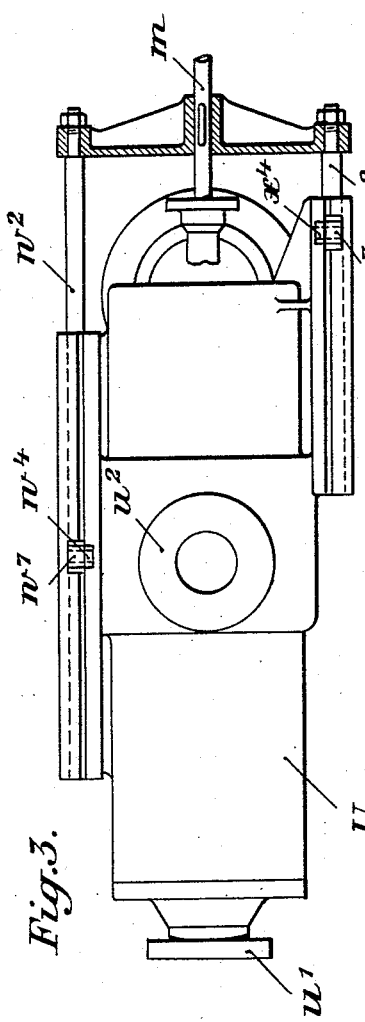
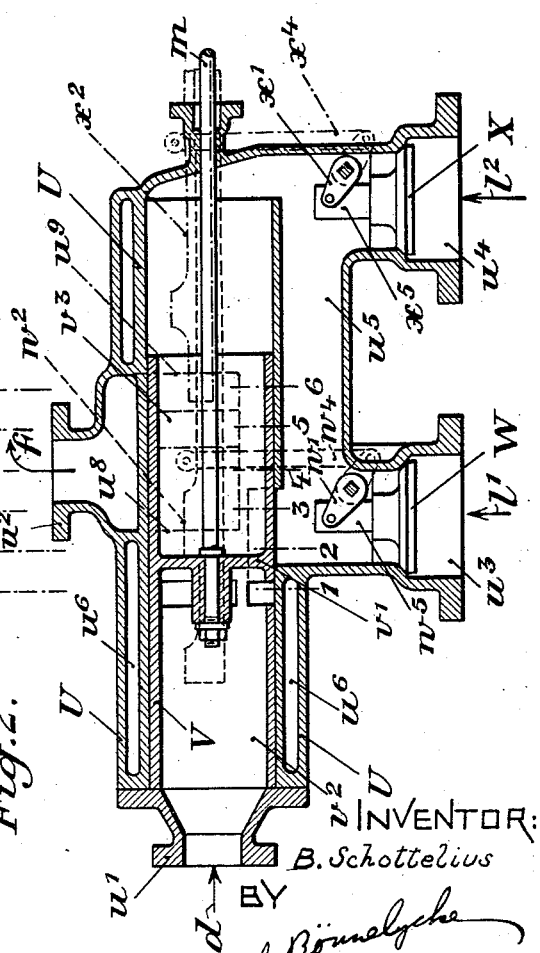
INVENTOR:
B. Schottelius
BY
Emil Bönnelyche
ATTORNEY.

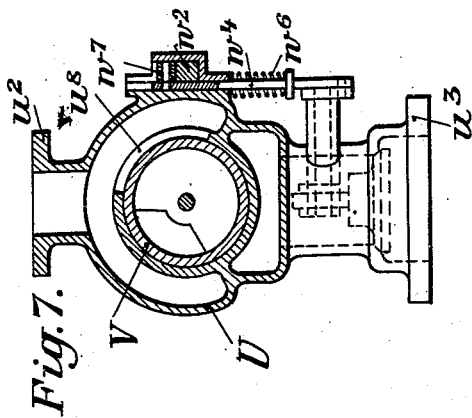
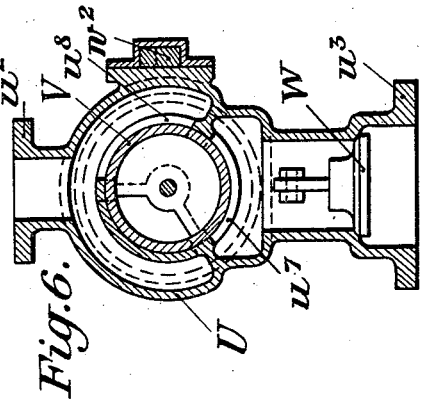
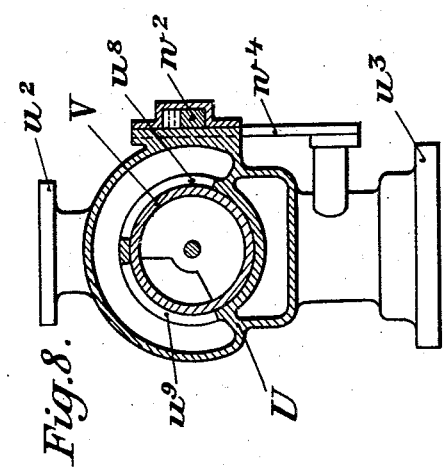
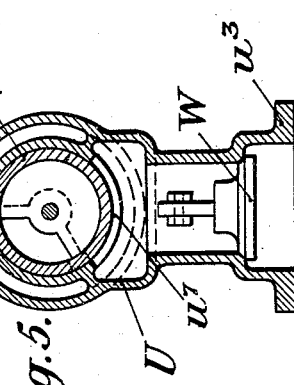
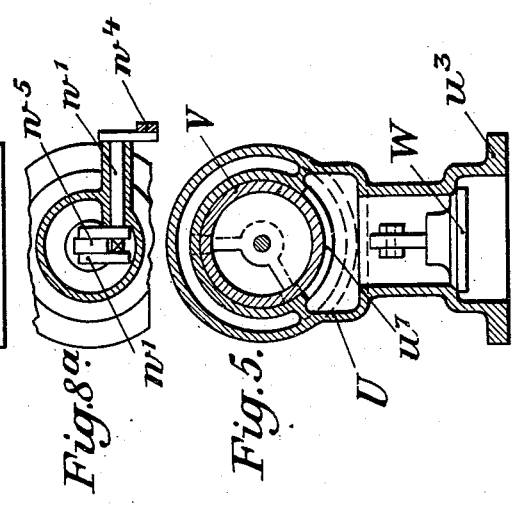
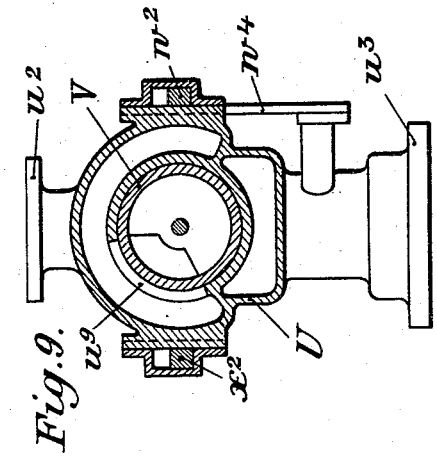
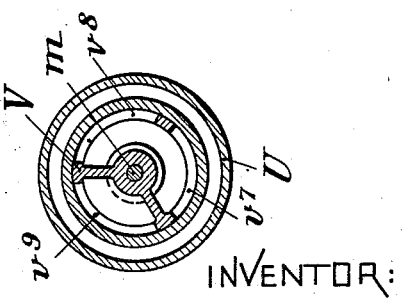

Aug. 26, 1930.  B. SCHOTTELIUS  1,774,293
POWER PRODUCING SYSTEM
Filed March 16, 1927    4 Sheets-Sheet 4
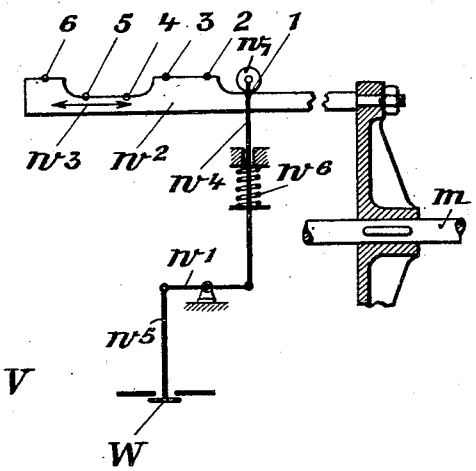
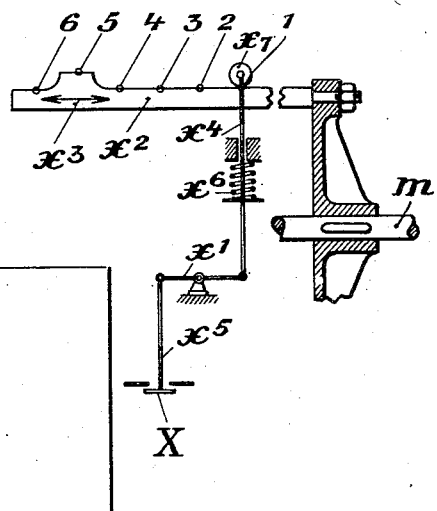
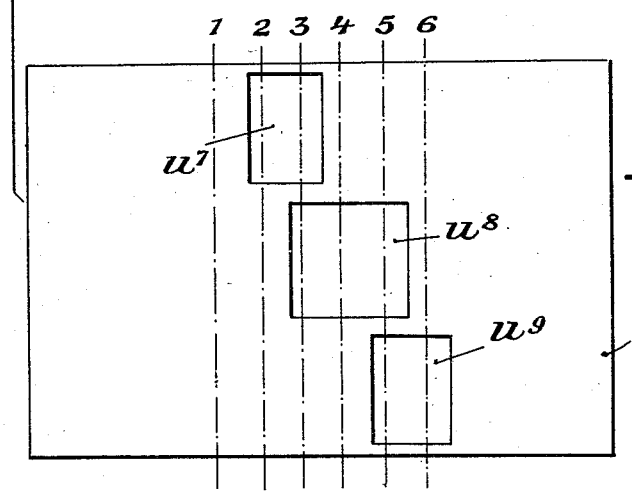
INVENTOR
B. Schottelius
BY
Emil Bonnelycke
ATTORNEY.

Patented Aug. 26, 1930

1,774,293

UNITED STATES PATENT OFFICE

BERNHARD SCHOTTELIUS, OF DUSSELDORF, GERMANY, ASSIGNOR TO RHEINISCHE METALLWAAREN- UND MASCHINENFABRIK, OF DUSSELDORF-DERENDORF, GERMANY, A CORPORATION OF GERMANY

POWER-PRODUCING SYSTEM

Application filed March 16, 1927, Serial No. 175,828, and in Germany December 21, 1925.

The invention relates to power producing systems which comprise a power delivering steam engine, a compressor adapted to recompress the exhaust steam of the steam engine, an internal combustion engine which drives said compressor, and a pipe connecting said compressor with the steam engine to supply steam to the latter and leading from the steam engine to the compressor to supply the exhaust steam of the steam engine to the latter, a high pressure heat accumulator being provided in said first-named pipe section and a low pressure heat accumulator in said last-named pipe section.

With the different conditions of operation of the system the accumulators either have to be completely shut off from the cycle formed by said pipe or have to be in communication by their inlet and exit pipe, respectively, with the steam engine or the compressor or with both these engines. Shut-off means must therefore be provided at the points where the pipes leading to the accumulators branch off from the cycle piping, by the aid of which means the pipes which are necessary can be connected up or other pipes which at that time are not used can be shut off.

Now my present invention has reference to the particular construction, arrangement and mode of connection of these controlling means and consists substantially in the fact that these means are positively actuated by means of a common manipulative lever system in such a manner that the accumulators are connected with the steam cycle in the manner required for the condition of the prevailing service.

In order to provide for a perfect operation of the control of the installation, an operating handle is connected together with the valve control mechanisms by means of a common device in such a way that when the operating handle is moved from the zero position, the valve members will one after the other be brought into positions corresponding to the steadily increasing load of the steam engine.

In order to have the operating lever system as simple and close as possible, all members to be operated are put together as closely as possible. These members are subdivided so as to form two groups one of which comprises the control members allotted to the high pressure heat accumulator whilst the other comprises those allotted to the low pressure heat accumulator. The shut-off members of each of these groups are lodged in a common casing. Both said groups of shut-off members are operated by a common operating member (pull rod, shaft) actuated from the driver's cabin for instance of a locomotive.

The control members have to be frequently thrown over during service. In order to have, in so doing as small frictional resistances as possible, an adequate balancing of these members is provided for.

In order to allow of my invention to be more easily understood, a preferred embodiment of same is illustrated by way of example in the drawings which accompany and form part of this specification. In these drawings:

Fig. 2 is a longitudinal section of one of the valves $e$ or $i$ of Fig. 1,

Fig. 3 is a top view of the valve,

Fig. 4 is a cross section on line 1—1 of Fig. 2,

Fig. 5 is a cross section on line 2—2 of Fig. 2,

Fig. 6 is a cross section on line 3—3 of Fig. 2,

Fig. 7 is a cross section on line 4—4 of Fig. 2,

Fig. 8 is a cross section on line 5—5 of Fig. 2,

Fig. 8a is a sectional view of a detail of the valve,

Fig. 9 is a cross section on line 6—6 of Fig. 2,

Fig. 10 is an end view partly in section of the valve of Fig. 2,

Fig. 11 is a development of the slide in the upper part and the face of the slide in the lower part, and Figs. 12 and 13 are detail views partly in section of the control mechanism.

Figure 1:
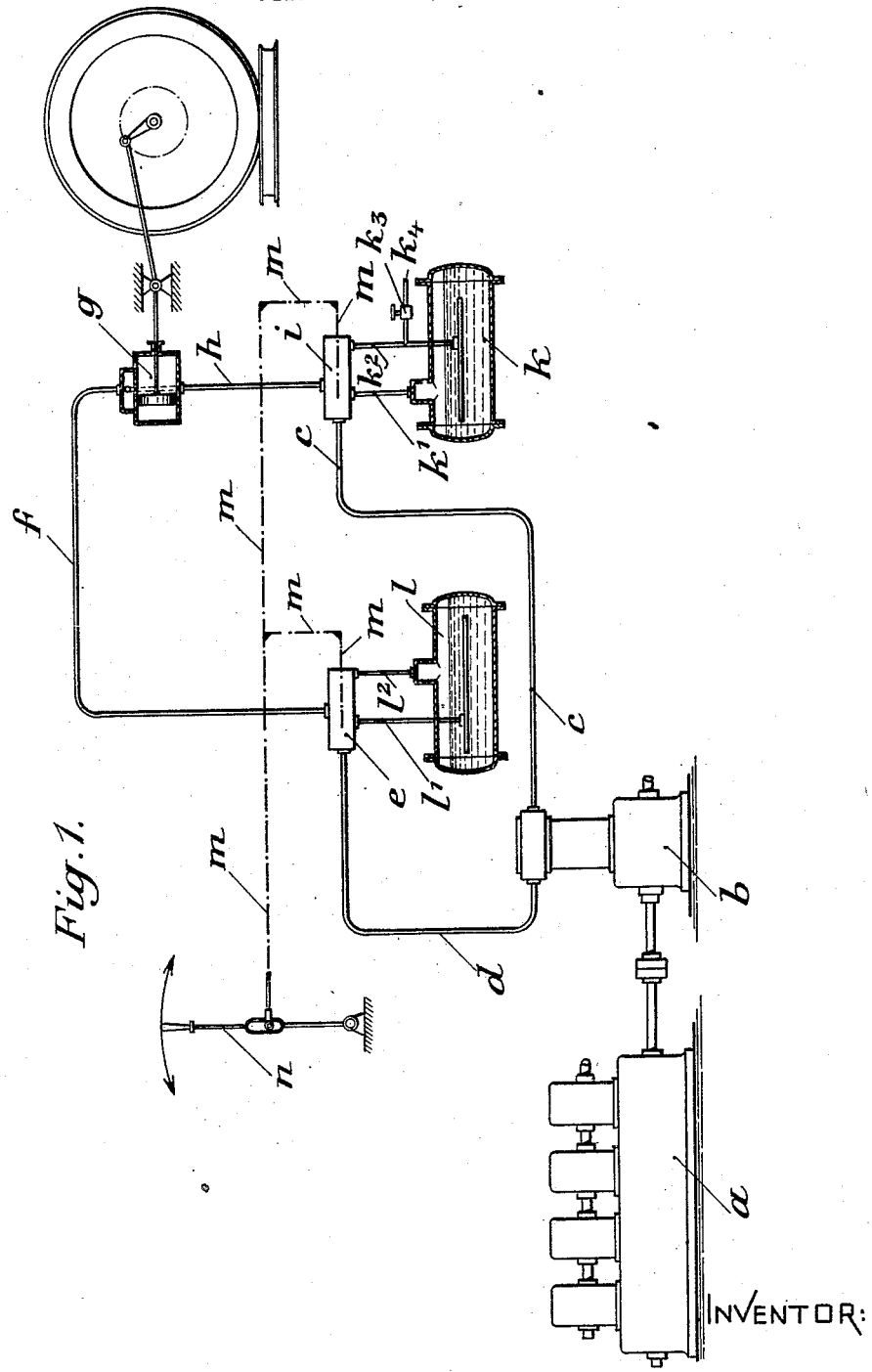
Fig. 1 is a diagrammatic view of the entire system.

The compressor $b$ driven by the Diesel engine $a$, see Fig. 1, compresses the steam supplied to it from the low pressure pipe $c$ and delivers it in highly compressed condition to the high pressure pipe $d$ and through the group of valves $e$ to pipe $f$ from where the steam arrives in the steam engine $g$. After having worked and expanded in engine $g$ the steam flows through pipe $h$, group of valve $i$ and pipe $c$ back to the compressor $b$. The low pressure accumulator $k$ and the high pressure accumulator $l$ are connected to the piping system $c$, $d$, $f$, $h$ by means of the inlet pipe $k^2$ and the draw off pipe $k^1$ by way of the valve group $i$ and the inlet pipe $l^1$ and the draw off pipe $l^2$ by way of valve group $e$ respectively.

The control members forming the groups $e$ and $i$ and by means of which the accumulators $l$ and $k$ are connected to the cycle piping in the manner just required or are shut off therefrom, are operated by the common pull rod $m$ which in its turn is operated by means of an operating lever $n$ disposed in the driver's cabin.

In starting the system when in a cold condition, it is first necessary to fill the pipes and accumulators with steam, which is accomplished by means of a pipe $k^4$ having a valve $k^3$ therein, which is preferably in communication with the pipe $k^2$ of the low pressure accumulator $k$. This construction is shown in Fig. 1. Pipe $k^4$ is in communication with any suitable steam boiler installation. The internal combustion engine $a$ is now started, which sets the compressor $b$ in operation and which will compress a part of the steam in the low pressure accumulator into the high pressure accumulator $l$ so that the high pressure accumulator will also be filled or supplied with steam. This condition of operation has the characteristic that the internal combustion engine and the compressor operate while the steam engine is inoperative. The valve elements are not only for filling or loading the high pressure accumulator but also for maintaining the system in the proper condition, when in operation, the internal combustion engine is running and the steam engine is stopped. In such a condition of operation, that is, in the condition of filling or standing still, the low pressure accumulator $k$ will be connected by the pipe $k'$ to the high pressure accumulator $l$ by means of the pipe $l'$ and the pipes $c$ and $d$ connected with the compressor $b$. In such operative condition, the pipes $f$ and $h$, leading to the steam engine, are closed from the remaining system.

The object of the accumulators is to hold off variations of power arising in the steam engine from the Diesel engine that introduces the energy in the system and is to run, in its turn, as uniformly as possible with the power with which it operates with the most favorable efficiency. The compressor $b$ is to deliver, if possible, always the same quantity of steam. For the operation of a steam engine having a varying output, however, a variable quantity of steam is required. Three conditions of operation thus take place, viz. those in which the steam consumption of engine $g$ is either smaller than or equal to or greater than the quantity of steam supplied by the compressor $b$. These conditions are denoted in the following by underload, full load and overload.

With underload the compressor $b$ holds the quantity of steam required for operating engine $g$, in a permanent cycle. Beyond this as much more steam is delivered from the low pressure accumulator $k$ to the high pressure accumulator $l$ and there stored up, as the power of the compressor $b$ surpasses the consumption of the steam engine. In this condition of service the low pressure accumulator $k$ and high pressure accumulator $l$ are to be connected with the cycle piping and thus with the compressor $b$ and steam engine $g$ through draw-off pipe $k^1$ and inlet pipe $l^1$, respectively.

With full load the power of the compressor $b$ is equal to the steam consumption of engine $g$. The accumulators $k$ and $l$ are therefore conveniently thrown out of operation.

With overload the compressor does not deliver as much steam as it is required for the operation of steam engine $g$. Complemental steam must therefore be supplied from the high pressure accumulator $l$ to steam engine $g$ which is then stored up in the low pressure accumulator. With this condition of service, in contradistinction to underload, the low pressure accumulator $k$ has to be connected through inlet pipe $k^2$, and the high pressure accumulator $l$ through draw-off pipe $l^2$ with the steam cycle and therewith with compressor $b$ and steam engine $g$.

In braking the power system and recuperating the braking energy, the steam engine $g$ is reversed while running to opposite sense of rotation. The engine then acts as compressor and must have supplied to it steam from the low pressure accumulator $k$ which is pressed by engine $g$ into the high pressure accumulator $l$. For this condition of service that may be denoted by "braking," the low pressure accumulator has to be connected through the draw-off pipe and the high pressure accumulator through the inlet pipe to the steam engine. The pipes leading to the compressor must be shut off.

Figs. 2 to 13 illustrate one of the valve groups $i$ or $e$ shown diagrammatically in Fig. 1.

The pipe $d$ connecting the pressure side of the compressor $b$ with the high pressure valve group $e$ is joined to the socket $u'$ of the casing U, while the pipe $f$ that leads to the steam engine $g$ is joined to socket $u^2$, inlet pipe $l'$ of the high pressure accumulator $l$ is joined to socket $u^3$ and draw-off pipe $l^2$ to socket $u^4$. An axially shiftable tubular piston valve V is adapted to glide in the casing U and is shifted by means of the main pull rod $m$ from the driver's cabin. The socket $u^3$ and $u^4$ have mounted in them two valves W and X which control the inlet pipe $l'$ leading to the accumulator $l$ and the draw-off pipe $l^2$, respectively. These valves are actuated from the pull rod $m$ by intermediate gears.

The upper portion of Fig. 11 shows a development of the piston valve V and the lower portion thereof shows that of the corresponding slide face. The latter possesses three slots $u^7$, $u^8$, $u^9$. Slot $u^7$ leads to chamber $u^5$ to which the accumulator pipes $l'$ and $l^2$ are connected; slots $u^8$ and $u^9$ lead to socket $u^2$ of inlet pipe $f$ of the steam engine. The piston valve V has likewise three slots $v^7$, $v^8$, $v^9$. Slots of valve and slide face, marked by similar indices cooperate. The whole space of piston valve V is divided by a partition $v'$, see Fig. 2, into two chambers $v^2$ and $v^3$. Chamber $v^2$ communicates with socket $u'$ and pipe $d$, leading to the compressor, chamber $v^3$ communicates with space $u^5$ and further with the inlet pipe $l'$ of the high pressure accumulator $l$, if valve W is open, or with the draw-off pipe $l^2$, if valve X is open. The valve slots $v^7$ and $v^8$ open into the chamber $v^2$ and slot $v^9$ into chamber $v^3$. In the development, upper portion, the partition $v'$ is indicated by a dot-and-dash line. To prevent a warping of the casing U due to different heating, the casing is provided with a heating jacket $u^6$.

In the form illustrated, the slide V assumes a position in the housing U so that the middle line I of the slot in the slide will coincide with line $l$ of the slide face. This position corresponds to the non-operative position of the installation and all pipe connections are closed. If the slide is so moved that the line I of the slide V, one after the other coincides with lines 2, 3, 4—6 of the housing U, then one after the other the connecting pipes will be brought into communication, which correspond to the conditions of operation such as, "Filling," "Partly charged", "Normal charge", "Over charge" and "Braking".

Figs. 12 and 13 show diagrammatically an embodiment of the means which operate the valves W and X.

The cam rods $w^2$ and $x^2$ are arranged in parallel to the rod $m$ of piston valve V and rigidly connected therewith so that they may be shifted together with rod $m$ in the direction of the arrows $w^3$ and $x^3$.

The cam rod $w^2$ and the spring $w^6$ operate, by means of the roller $w^7$ and the rods $w^4$, $w'$ and $w^5$, the valve W, Fig. 12, and in the same manner the valve X is operated by the cam rod $x^2$ and the spring $x^6$ by means of the roller $x^7$ and the rods $x^4$, $x'$ and $x^5$, Fig. 13. Upon movement of the slide V in such a way that the middle line I of the slide slots corresponds with the lines 1, 2, 3—6 of the slide face, the points 1, 2, 3—6 of the cam rods $w^2$ and $x^2$ will be placed under the rollers $w^7$ and $x^7$.

When cam rod $w^2$ is in position 1, 4 and 5, valve W is closed, when it is in position 2, 3 and 6, valve W is open. In position $l$ of the valves thus all pipes are shut off (position of rest). In position 2 only pipe $d$ leading from the compressor, is connected to the inlet pipe $l'$ (filling) in position 3 all pipes are opened except the draw-off pipe of the high pressure accumulator (underload). In position 4 only the pipes $d$ and $f$ are connected with one another, while the accumulator pipes are shut off. In position 5 all pipes are open except the inlet pipe of the high pressure accumulator (overload). In position 6 only the inlet pipe $l'$ of the high pressure accumulator is connected with pipe $f$ leading from engine $g$ (braking).

The valve group $i$ of the low pressure accumulator $h$ is the same as the valve group $e$ except that the openings for the steam are larger since the steam under lower pressure has a greater volume.

It is, however, to be noted that at the low pressure valve group $i$ an inlet pipe $k^2$ of the accumulator $k$ is connected to the socket $u^4$ and the outlet pipe $k$ to the socket $u^3$. The inlet and outlet pipes are therefore reversed. This arrangement of the pipes ensures that one accumulator will be in communication with the outlet pipes to the steam installation and the other is connected thereto by the inlet pipe.

What I claim as my invention and desire to secure by Letters Patent, is:—

1. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, means for controlling passages establishing connections between said accumulators and said steam engine and compressor, and a common actuating means for said controlling means to change the connections between the accumulators, the steam engine, and the compressor so that the system may carry out a non-operating, filling, charging or braking requirement.

2. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, a means for controlling passages establishing connections between said high pressure heat accumulator and said steam engine and compressor, another means for controlling the same passages between said low pressure heat accumulator and said steam engine and compressor, said means having each a member adapted to control all passages required for the appurtenant accumulator and a common actuating means for the controlling means to change the connections between the accumulators, the steam engine, and the compressor so that the system may carry out a non-operating, filling, charging or braking requirement.

3. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, means for controlling in consecutive order passages establishing connections between said accumulators and said steam engine and compressor, and a common actuating means for said controlling means to change the connections between the accumulators, the steam engine, and the compressor so that the system may carry out a non-operating, filling, charging or braking requirement.

4. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, a means for controlling in consecutive order passages establishing connections between said high pressure heat accumulator and said steam engine and compressor, another means for controlling in consecutive order the same passages between said low pressure heat accumulator and said steam engine and compressor, said two means having each a member adapted to control all passages required for the appurtenant accumulator and a common actuating means for the controlling means to change the connections between the accumulators, the steam engine, and the compressor so that the system may carry out a non-operating, filling, charging or braking requirement.

5. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, means for controlling in consecutive order passages establishing connections between said accumulators and said steam engine and compressor for rest and forward run of the steam engine, and for establishing a connection between said parts for braking the engine and recuperating the braking energy, said means having a common actuating means.

6. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, means for controlling in consecutive order passages establishing connections between said accumulators and said steam engine and compressor for rest and forward run of the steam engine, and for establishing a connection between said parts for braking the engine and recuperating the braking energy, said means having each a member adapted to control all passages required for the appurtenant accumulator and a common actuating means for the controlling means.

7. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, means for controlling in consecutive order passages establishing connections between said accumulators and said steam engine for rest and forward run of the steam engine, and for establishing a connection between said parts for filling the system with starting steam, said means having each a member adapted to control all passages required for the appurtenant accumulator and a common actuating means for the controlling means.

8. A power producing system comprising a steam engine, a compressor to re-compress the exhaust steam of said engine, an internal combustion engine adapted to actuate said compressor, pipes connecting said compressor with said steam engine, a high pressure heat accumulator and a low pressure heat accumulator interposed, respectively, in said pipe sections, means for controlling passages establishing connections between said accumulators and said steam engine and compressor, a common actuating means for said controlling means, said controlling means comprising a main valve, sub-valves co-operating therewith, cam gears and operative connection between them and said actuating means and said sub-valves to change the connections between the accumulators, the steam engine, and the compressor so that the system may carry out a non-operating, filling, charging or braking requirement.

In testimony whereof I have affixed my signature.

BERNHARD SCHOTTELIUS.